United States Patent [19]

Kóno et al.

[11] Patent Number: 4,867,122
[45] Date of Patent: Sep. 19, 1989

[54] THROTTLE OPENING CONTROL ACTUATOR

[75] Inventors: Teruhisa Kóno; Koji Takata; Koichi Hashida, all of Hyogo, Japan

[73] Assignee: Sumitomo Electric Industries, Ltd., Osaka, Japan

[21] Appl. No.: 243,423

[22] Filed: Sep. 12, 1988

[51] Int. Cl.$^4$ ............................................. F02D 7/00
[52] U.S. Cl. ....................................... 123/396; 180/197
[58] Field of Search ............... 123/396, 395, 361, 352, 123/378, 399, 400, 401; 180/197

[56] References Cited

U.S. PATENT DOCUMENTS

| | | | |
|---|---|---|---|
| 4,343,277 | 8/1982 | Ohnka et al. | 123/396 |
| 4,452,203 | 6/1984 | Oshika et al. | 123/395 |
| 4,637,487 | 1/1987 | Nakamura et al. | 180/197 |
| 4,685,547 | 8/1987 | Ohashi et al. | 180/197 |
| 4,703,823 | 11/1987 | Yogo et al. | 123/361 |
| 4,727,840 | 3/1988 | Nishida et al. | 123/399 |
| 4,747,461 | 5/1988 | Hayn et al. | 123/396 |
| 4,750,582 | 6/1988 | Wiaas | 123/396 |
| 4,759,184 | 7/1988 | Kita | 123/396 |
| 4,771,849 | 9/1988 | Laiber et al. | 180/197 |

Primary Examiner—Raymond A. Nelli
Attorney, Agent, or Firm—W. G. Fasse; D. H. Kane, Jr.

[57] ABSTRACT

A throttle opening control actuator is provided between a throttle (2) which is regularly urged by a return spring (5) in a direction for decreasing its opening in order to regulate engine output of a vehicle and an acceleration pedal (1) which is coupled to the throttle (2) by a cable (7). The throttle opening control actuator comprises a pump (17), a cylinder (10), a piston (11), a movable element (13) which is fixed to the piston (11), an opening direction contact part (8) which is forcibly pushed by the movable element (13) in a direction for increasing throttle opening upon displacement of the movable element (13) in one direction, a closing direction contact part (9) which is forcibly pushed by the movable element (13) in a direction for decreasing throttle opening upon displacement of the movable element (13) in the other direction and an electrical switch (23) for electrically detecting the state of contact between the movable element (13) and the opening direction contact part (8) and that between the movable element (13) and the closing direction contact part (9).

9 Claims, 4 Drawing Sheets

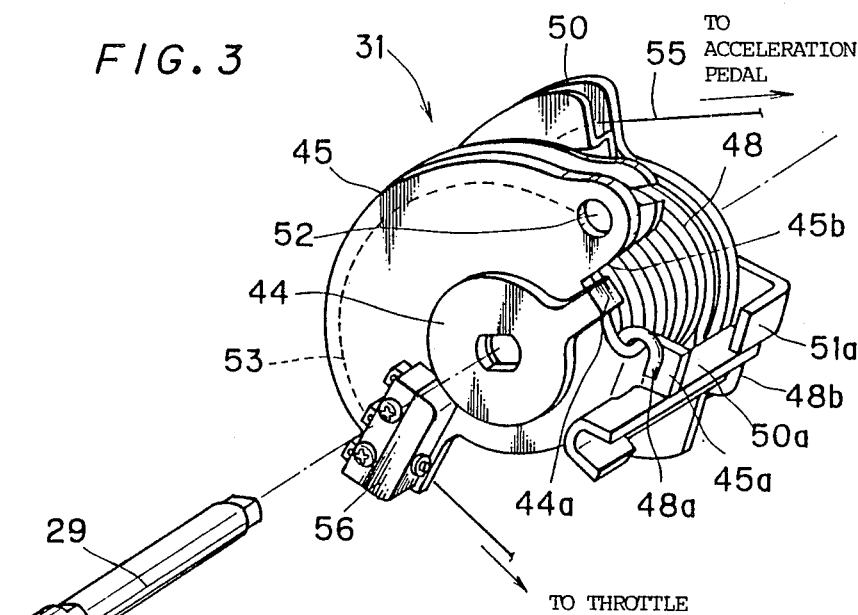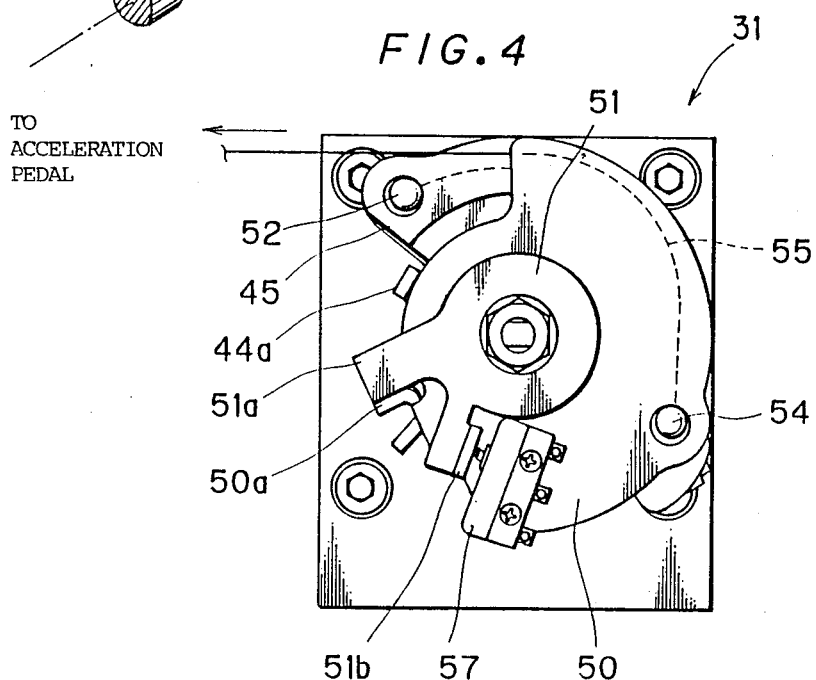

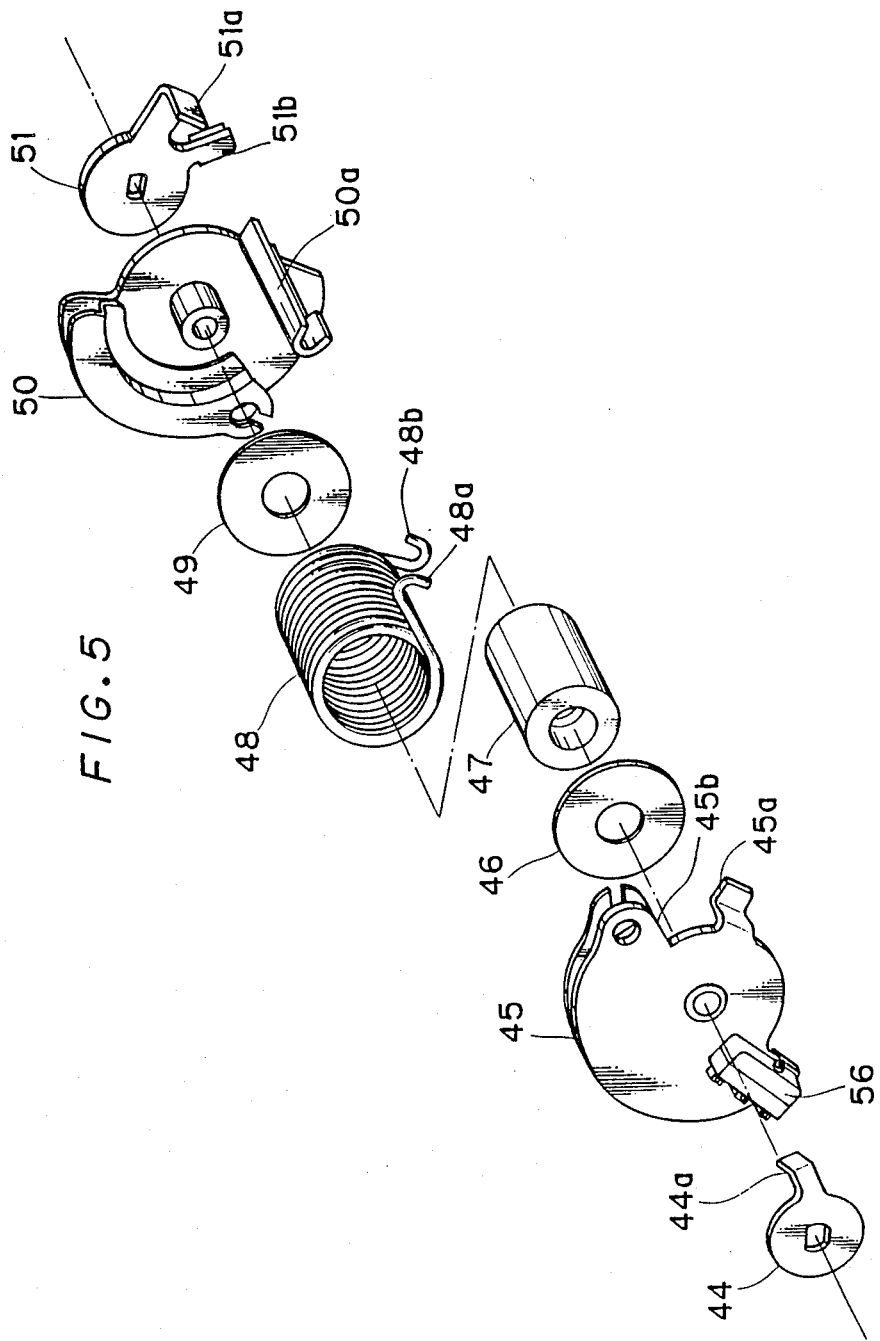

THROTTLE OPENING CONTROL ACTUATOR

FIELD OF THE INVENTION

The present invention relates to a throttle opening control actuator, and more particularly, it relates to a throttle opening control actuator which controls the degree of opening of a throttle to regulate engine output of a vehicle, in order to perform slip control of driving wheels in starting or acceleration of the vehicle, vehicle-to-vehicle distance control, constant speed running control and the like.

DESCRIPTION OF THE PRIOR ART

In order to perform slip control in starting or acceleration of a vehicle, vehicle-to-vehicle distance control, constant speed running control or the like, data from a sensor for detecting the wheel speed, a sensor for detecting the distance to a vehicle running ahead and other sensors are transmitted to an electronic information processing system. Then, the electronic information processing system supplies a command to a throttle opening control actuator. The throttle opening control actuator controls opening of a throttle on the basis of this command, thereby to regulate engine output.

In such a control system which is well known in the art, the throttle opening is controlled in two directions. During operation of an acceleration pedal by a driver in slip control or vehicle-to-vehicle distance control, for example, the throttle opening is controlled in a decreasing direction. On the other hand, the throttle opening is controlled in an increasing direction when the driver's control input to the acceleration pedal is not more than a constant value in constant speed running control or the like. For example, each of Japanese Patent Laying-Open Gazettes Nos. 75023/1986 and 75024/1986 discloses a system of performing such two-directional control by a single actuator.

In either control, priority must be given to the driver's operation when the driver's control input to the acceleration pedal exceeds the controlled variable of the throttle opening by the actuator. If the driver desires to decelerate the vehicle when the throttle opening is being controlled by the actuator in the decreasing direction for optimum slip of the driving wheels in slip control upon starting and relieves the acceleration pedal so that the control input is less than the controlled variable, for example, it is preferable to stop control by the actuator and immediately decrease the throttle opening to a level corresponding to the control input to the acceleration pedal. On the other hand, if the driver desires to accelerate the vehicle over a set vehicle speed when the throttle opening is being controlled by the actuator in the increasing direction for increasing the actual vehicle speed toward a set speed and treads on the acceleration pedal so that the control input exceeds the controlled variable, it is preferable to stop control by the actuator and increase the throttle opening to a level corresponding to the control input to the acceleration pedal.

Well known is a system of performing such two-directional control by a single actuator while giving priority to the driver's operation of the acceleration pedal. In this system, the acceleration pedal is not mechanically coupled to but separated from the throttle, while the input to the acceleration pedal is regularly detected by a potentiometer. The throttle opening is controlled by an electric motor or the like, in response to continuous analog values detected by the potentiometer. In this system, however, even normal running is disabled if the electric motor is at fault, for example.

The system disclosed in Japanese Patent Laying-Open No. 75023/1986 or 75024/1986 solves the aforementioned problem by coupling the acceleration pedal with the throttle through mechanical coupling means. Further, priority is given to the driver's control input to the acceleration pedal even if the throttle opening is being controlled by the actuator in the decreasing or increasing direction.

In each of the systems disclosed in Japanese Patent Laying-Open Gazette Nos. 75023/1986 and 75024/1986, however, no means is provided to compare the driver's control input to the acceleration pedal with the controlled variable of the throttle opening by the actuator. Therefore, operation of the actuator is still continued after priority is given to the driver's control input to the acceleration pedal. It is assumed here that the driver reduces control input to the acceleration pedal when the throttle opening is being controlled by the actuator in the decreasing direction. In this case, the throttle opening is decreased to be less than optimum throttle opening in control, while a command for relaxing the control in the direction for decreasing the throttle opening is continuously supplied to the actuator since no means is provided to detect such a state. In other words, the actuator continuously performs operation for increasing the throttle opening, which is decreased by the operation of the acceleration pedal. Such operation of the actuator is completed when its operating position returns to an original position in advance to the control. Therefore, when the driver treads on the acceleration pedal again, the actuator re-starts control operation from its original position. Such control operation is inferior in its response characteristic compared to the case of stopping the control when the driver's control input to the acceleration pedal is less than the controlled variable by the actuator and again starting the control operation following a stopped condition.

Further, the system disclosed in Japanese Patent Laying-Open Gazette No. 75024/1986 requires two types of coupling means for mechanically coupling the acceleration pedal with the throttle, i.e., a normal coupling and a further coupling through the actuator.

SUMMARY OF THE INVENTION

An object of the present invention is to provide a throttle opening control actuator which can solve the aforementioned problems.

The throttle opening control actuator according to the present invention is provided between a throttle which is regularly urged by a return spring in a direction for decreasing its opening in order to regulate engine output of a vehicle and an acceleration pedal which is coupled with the throttle by mechanical coupling means. The throttle opening control actuator comprises:

(a) a driving unit for supplying driving force;

(b) a movable element which is displaceable in opposite directions by the driving force from the driving unit;

(c) an opening direction contact part which is provided in an intermediate position of the mechanical coupling means to be in contact with the movable element upon displacement of the movable element in one direction and forcibly pushed by the movable element in a direction for increasing throttle opening;

(d) a closing direction contact part which is provided in an intermediate position of the mechanical coupling means to be in contact with the movable element upon displacement of the movable element in the other direction and forcibly pushed by the movable element in a direction for decreasing the throttle opening;

(e) opening direction detecting means for electrically detecting the state of contact between the movable element and the opening direction contact part; and (f) closing direction detecting means for electrically detecting the state of contact between the movable element and the closing direction contact part.

As to the operation performed when the actuator controls the throttle opening in a decreasing direction, it is assumed here that the movable element receiving the driving force from the driving unit forcibly displaces the closing direction contact part in an opening decreasing direction against operating physical force by the driver during operation of the acceleration pedal by the driver, thereby to control the throttle opening in the decreasing direction. If the driver desires to decelerate the vehicle during such control and reduces control input to the acceleration pedal, the closing direction contact part moves toward the throttle with the mechanical coupling means by action of a return spring, whereby relation between the operating physical force and the throttle opening is equalized to that in non-control operation. When the control input to the acceleration pedal is further reduced, the movable element is separated from the closing direction contact part. The closing direction detecting means immediately detects such change in the contact state. Control operation by the driving unit can be stopped on the basis of information from the closing direction detecting means.

As to operation performed when the actuator controls the throttle opening in an increasing direction, it is assumed that the movable element receiving the driving force from the driving unit forcibly displaces the opening direction contact part in an opening increasing direction so that the travel speed approaches a set vehicle speed when the driver's control input to the acceleration pedal is not more than a constant value, thereby to increase the throttle opening. If the driver increases the control input to the acceleration pedal for accelerating the vehicle, the opening direction contact part moves toward the acceleration pedal with the mechanical coupling means, whereby relation between the operating physical force and the throttle opening is equalized to that in non-control operation. When the control input to the acceleration pedal is further increased, the movable element is separated from the opening direction contact part. The opening direction detecting means immediately detects such change in the contact state. Thus, control operation by the driving unit can be stopped on the basis of information from the opening direction detecting means.

As hereinabove described, the aforementioned problems are solved by the present invention which provides a throttle opening control actuator having excellent performance responsibility.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a perspective view of a wire driving part 31 shown in FIG. 2;

FIG. 4 shows the wire driving part 31, as viewed from a direction A shown in FIG. 2; and FIG. 5 is an exploded perspective view showing respective elements forming the wire driving part 31.

DESCRIPTION OF THE PREFERRED EMBODIMENTS

Figure 1:
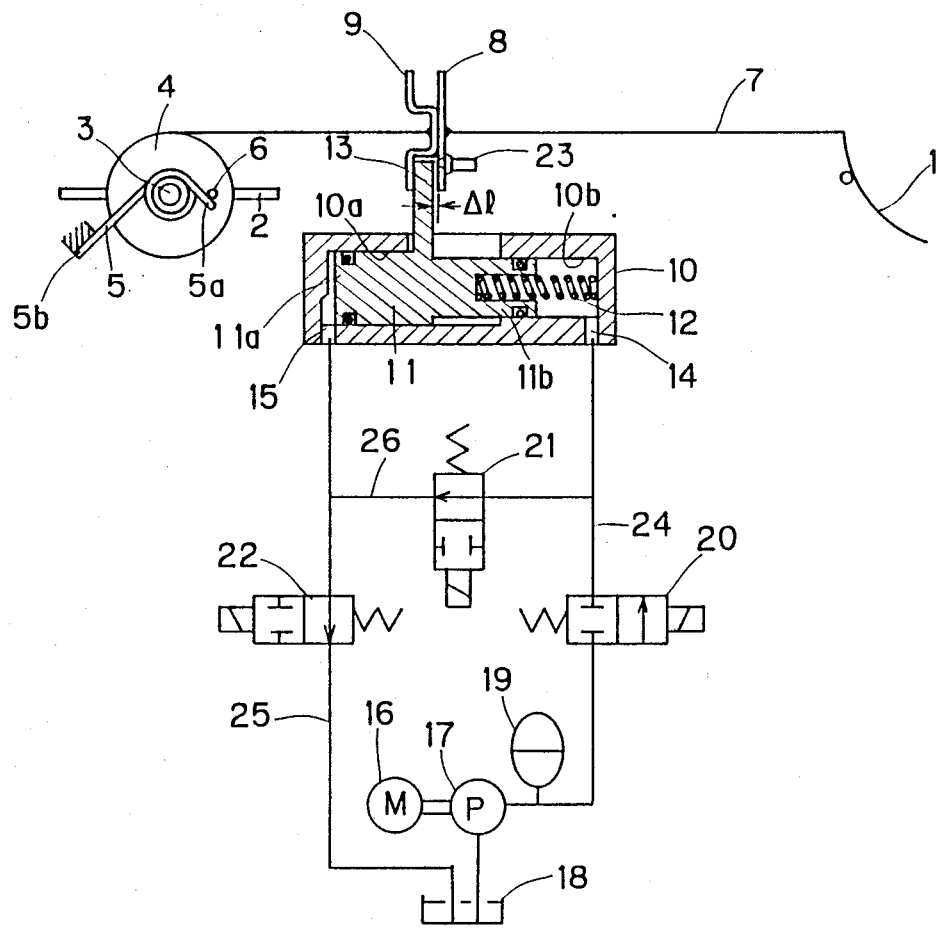
FIG. 1 illustrates a first embodiment of the present invention.

FIG. 1 shows a first embodiment of the present invention.

A throttle 2 for regulating engine output by changing the degree of its opening is coupled with an acceleration pedal 1 by a cable 7, which serves as mechanical coupling means. In more concrete terms, the throttle 2 and a pulley 4 are fixed to a rotary shaft 3, and the cable 7 extending from the acceleration pedal 1 is wound on and fixed to the pulley 4. When a driver treads on the acceleration pedal 1, the cable 7 moves, toward the acceleration pedal 1, whereby the throttle 2 rotates in a direction for increasing its opening, i.e., clockwisely in the figure. A return spring 5 is so provided that its first end 5a is engaged with an engaging pin 6 which is upwardly provided on the pulley 4 and its second end 5b is engaged with a stationary object. The return spring 5 regularly urges the throttle 2 to rotate in a direction for decreasing its opening, i.e., counterclockwise in the figure.

A throttle opening control actuator is provided between the throttle 2 and the acceleration pedal 1, which are coupled with each other through the cable 7. In more concrete terms, an opening direction contact part 8 and a closing direction contact part 9 are provided in an intermediate position of the cable 7. A movable element 13 is inserted in a clearance defined between the opening and closing direction contact parts 8 and 9. This movable element 13 is fixed to a piston 11, which is movably provided in a cylinder 10. Thus, the movable element 13 moves with the piston 11.

The interval between the opening and closing direction contact parts 8 and 9 is larger by a small space Δl than the width of the movable element 13 which is inserted therein. Therefore, the movable element 13 is brought into contact with the opening direction contact part 8 upon rightward movement from the state shown in FIG. 1. When the movable element 13 further moves in this way, the opening direction contact part 8 is pushed by the movable element 13 to rightwardly move in the figure. In response to this, the cable 7 also rightwardly moves to increase opening of the throttle 2.

On the other hand, the movable element 13 is brought into contact with the closing direction contact part 9 upon leftward movement in FIG. 1. The closing direction contact part 9 is pushed by the movable element 13 to leftwardly move with the cable 7, thereby to decrease opening of the throttle 2.

The cylinder 10 is provided with a large bore 10a having a large diameter and a small bore 10b having a small diameter. The piston 11 is responsively provided with a large portion 11a having a large diameter and a small portion 11b having a small diameter. The piston 11 is regularly urged by a spring 12 toward the large bore 10a of the cylinder 10. The cylinder 10 is further provided with a port 14 communicating with the small bore 10b and another port 15 communicating with the large bore 10a.

High-pressure fluid sucked from a reservoir 18 and pressurized by a pump 17, which is driven by a motor 16, is accumulated in an accumulator 19. The high-pressure fluid is guided to the port 14 of the cylinder 10 through a fluid path 24. On the other hand, fluid discharged from the large bore 10a of the cylinder 10 through the port 15 is collected in the reservoir 18 through another fluid path 25.

The fluid path 24 connecting the accumulator 19 with the port 14 of the cylinder 10 is provided with an electromagnetic directional control valve 20. This electromagnetic directional control valve 20 is implemented by two-port two-position directional control valve, which is urged by a spring to a first position shown in the figure in a non-energized state, to cut off either flow of the fluid. Upon energization, the electromagnetic directional control valve 20 is switched to a second position to allow a fluid flow from the accumulator 19 to the port 14.

Another electromagnetic directional control valve 22 is provided in the fluid path 25 connecting the port 15 of the cylinder 10 with the reservoir 18. This electromagnetic directional control valve 22 is also implemented by a two-port two-position directional control valve, which is urged by a spring to a first position shown in the figure in a non-energized state, to allow a fluid flow from the port 15 to the reservoir 18. Upon energization, the electromagnetic directional control valve 22 cuts off either flow of the fluid.

As shown in FIG. 1, still another electromagnetic directional control valve 21 is provided in a fluid path 26 which connects the fluid paths 24 and 25 with each other. The electromagnetic directional control valve 21 is implemented by a two-port two-position directional control valve, which is urged by a spring to a first position shown in the figure in a non-energized state, to allow a fluid flow from the fluid path 24 to the fluid path 25. Upon energization, the electromagnetic directional control valve 21 cuts off either flow of the fluid.

The opening direction contact part 8 is provided with an electrical switch 23, which serves as opening direction detecting means for electrically detecting the state of contact between the movable element 13 and the opening direction contact part 8. This electrical switch 23 is in an OFF state when the movable element 13 is separated from the opening direction contact part 8 with the small space.

When the movable element 13 comes into contact with the opening direction contact part 8, the electrical switch 23 enters an ON state.

Operation of the first embodiment is now described.

When the driver treads on the acceleration pedal 1, the movement of the acceleration pedal 1 is transmitted through the cable 7 to the throttle 2, which in turn rotates in the direction for increasing its opening against the return spring 5. At this time, the movable element 13 positioned between the opening and closing direction contact parts 8 and 9 is pushed by the closing direction contact part 9 to move toward the acceleration pedal 1 with the piston 11.

In order to perform traction control in this state, the movable element 13, for example, is controlled to move in the direction for decreasing opening of the throttle 2. The electromagnetic directional control valves 20 and 21 are energized and switched to the second positions respectively. Consequently, the high-pressure fluid contained in the accumulator 19 is introduced into the small bore 10b of the cylinder 10, to push the piston 11 toward the large bore 10a. Thus, the movable element 13 is brought into contact with the closing direction contact part 9, to forcibly push the closing direction contact part 9 in the direction for decreasing throttle opening, against the driver's operating physical force. Thus, the opening of the throttle 2 is decreased to a prescribed degree. In this case, the movable element 13 is separated from the opening direction contact part 8 with the small space Δl. Therefore, the electrical switch 23 is in an OFF state.

When the driver reduces control input to the acceleration pedal 1 in this state, the cable 7 moves in the direction for decreasing the throttle opening by spring force of the return spring 5, whereby the opening and closing direction contact parts 8 and 9 move in the direction for decreasing the throttle opening. Thus, the closing direction contact part 9 is separated from the movable element 13. When the driver further reduces the control input to the acceleration pedal 1 so that the amount of relative movement of the opening and closing direction contact parts 8 and 9 with respect to the movable element 13 exceeds Δl, the movable element 13 comes into contact with the opening direction contact part 8. Upon such contact of the movable element 13 and the opening direction contact part 8, the electrical switch 23, serving as opening direction detecting means, enters an ON state, thereby to detect the fact that the driver's control input to the acceleration pedal 1 in the direction for decreasing the throttle opening exceeds the controlled variable by the driving unit. On the basis of this information, control operation by the driving unit is stopped. In other words, both of the electromagnetic directional control valves 20 and 21 are brought into non-energized states.

In order to increase the opening of the throttle 2 when the driver's operating physical force to the acceleration pedal 1 is not more than a constant value in constant speed running control, for example, the electromagnetic directional control valves 20 and 22 are energized. Then the high-pressure fluid contained in the accumulator 19 is introduced into the small bore 10b of the cylinder 10 through the port 14, as well as into the large bore 10a of the cylinder 10 through the port 15. Consequently, the piston 11 moves toward the small bore 10b against spring force of the spring 12, by urging force corresponding to area difference between the large portion 11a and the small portion 11b.

With the above movement of the piston 11, the movable element 13 also moves to come into contact with the opening direction contact part 8, thereby to push the opening direction contact part 8 in the direction for increasing the opening of the throttle 2. The electrical switch 23 enters an ON state when the movable element 13 comes into contact with the opening direction contact part 8.

The electromagnetic directional control valve 20 is brought into a non-energized state when the opening of the throttle 2 reaches a prescribed degree, whereby constant fluid pressure is maintained to act on the piston 11, to keep the desired throttle opening. When the vehicle comes upon a downward slope and its speed is increased, the electromagnetic directional control valve 22 is temporarily brought into a non-energized state to reduce the fluid pressure, thereby to decrease the opening of the throttle 2. When the vehicle comes upon an upward slope and its speed is reduced, on the other hand, the electromagnetic directional control valve 20 is temporarily energized to increase the fluid pressure, thereby to increase the throttle opening.

If the driver treads on the acceleration pedal 1 in excess of the controlled variable by the driving unit in this state, the opening direction contact part 8 is separated from the movable element 13, whereby the electrical switch 23 enters an OFF state. When the electrical switch 23 thus detects that the driver's control input to the acceleration pedal 1 exceeds the controlled variable by the driving unit, all of the electromagnetic directional control valves 20, 21 and 22 are brought into the non-energized states shown in the figure, whereby control operation by the driving unit is stopped.

Means corresponding to the electrical switch 23 may be provided in the closing direction contact part 9, to serve as closing direction detecting means. In the first embodiment shown in FIG. 1, information from the electrical switch 23 is utilized also as closing direction detecting means since the space $\Delta l$ between the movable element 13 and the contact part 8 or 9 is small. In other words, the reversed position of the opening direction detecting means serves as closing direction detecting means.

Figure 2:
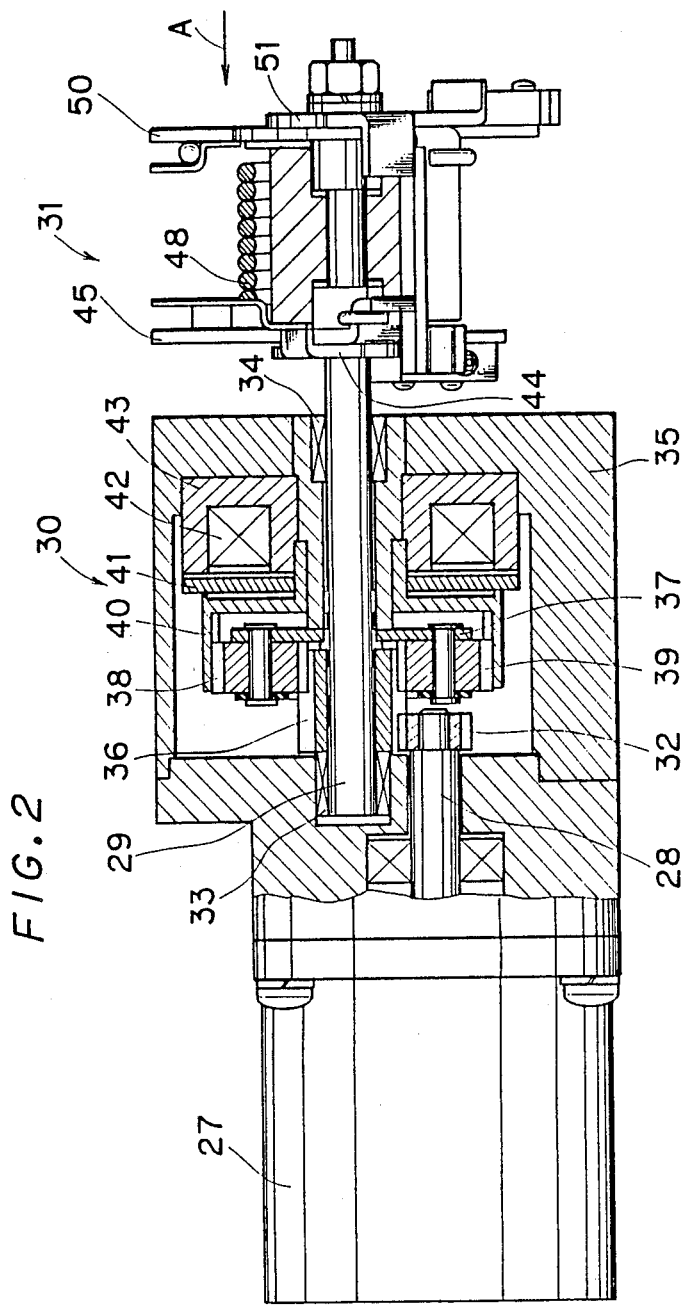
FIG. 2 illustrates a second embodiment of the present invention.

FIG. 2 shows a second embodiment of the present invention. While the movable element in the first embodiment is driven to linearly move by a hydraulic cylinder, a movable element in the second embodiment is driven to rotate by an electric motor.

A throttle opening control actuator shown in FIG. 2 comprises a motor 27 serving as a driving source, a power transmission part 30 for transmitting rotation of an output shaft 28 of the motor 27 to a rotary shaft 29 in a decelerating manner and a wire driving part 31. The wire driving part 31 is adapted to drive a wire coupling a throttle with an acceleration pedal toward the throttle or the acceleration pedal, and has a movable element, an opening direction contact part, a closing direction contact part and the like.

Description is now made on structure concerning the motor 27 and the power transmission part 30.

A gear 32 is fixedly mounted on the output shaft 28 of the motor 27. The rotary shaft 29 is rotatably supported by a body 35 through bea'ings 33 and 34. The rotary shaft 29 rotatably supports a sun gear 36, which is meshed with the gear 32. Further, a plate 37 is fixedly mounted on the rotary shaft 29.

The plate 37 thus fixed to the rotary shaft 29 rotatably supports planetary gears 38 and 39, which are meshed with the sun gear 36. The body 35 rotatably supports an internal gear 40 having teeth which are meshed with the planetary gears 38 and 39 in its inner peripheral portion. The axis of rotation of the internal gear 40 coincides with that of the rotary shaft 29. The internal gear 40 has a clutch plate 41.

A stator 43 having an electromagnetic coil 42 is provided to face the clutch plate 41. This stator 43 is fixed to the body 35.

When the coil 42 is not energized, the clutch plate 41 is separated from the stator 43, to allow rotation of the internal gear 40. In other words, revolution is not required for the planetary gears 38 and 39, which are driven to rotate through the gear 32 and the sun gear 36. Thus, no rotation of the output shaft 28 of the motor 27 is transmitted to the rotary shaft 29.

In another point of view, the rotary shaft 29 can rotate independently of the motor 27. If the rotary shaft 29 rotates when the sun gear 36 is in a stationary state, for example, the planetary gears 38 and 39 revolve around the sun gear 36.

When the coil 42 is energized on the other hand, the clutch plate 41 is attracted by the stator 43, to inhibit rotation of the internal gear 40. Therefore, when the sun gear 36 is driven by the motor 27 to rotate, the planetary gears 38 and 39 revolve around the sun gear 36. The plate 37 also rotates following such revolution of the planetary gears 38 and 39, to cause rotation of the rotary shaft 29, which is integrated with the plate 37. Thus, rotation of the output shaft 28 of the motor 27 is transmitted to the rotary shaft 27 in a decelerated manner.

The rotary shaft 29 projects from the body 35, to be provided with the wire driving part 31. FIG. 3 is a perspective view showing the wire driving part 31, and FIG. 4 shows the wire driving part 31 as viewed from a direction A in FIG. 2. FIG. 5 is an exploded perspective view showing respective elements forming the wire driving part 31.

Provided on a part of the rotary shaft 29 projecting from the body 35 are a deceleration hook 44, a deceleration pulley 45, a spacer 46, a spring guide 47, a torsion spring 48, another spacer 49, an acceleration pulley 50 and an acceleration hook 51, in order from the body 35 side. The torsion spring 48 is adapted to enclose the spring guide 47. Both the deceleration hook 44 and the acceleration hook 51 are fixed to the rotary shaft 29, thereby to rotate with the rotary shaft 29. The deceleration pulley 45, the spacer 46, the spring guide 47, the torsion spring 48, the spacer 49 and the acceleration pulley 50 are rotatable on the rotary shaft 29.

The wire driving part 31 is provided in an intermediate position of the wire coupling the throttle with the acceleration pedal. This wire is divided into a throttle side wire 53 and an acceleration pedal side wire 55. The throttle side wire 53 extending from the throttle is coupled to the deceleration pulley 45 through a pin 52 which is mounted on its forward end. The acceleration pedal side wire 55 extending from the acceleration pedal is coupled to the acceleration pulley 50 through a check pin 54 which is mounted on its forward end.

The deceleration pulley 45 has a hook-shaped pawl 45a. The acceleration pulley 50 has an engaging wall portion 50a which extends toward the deceleration pulley 45. The torsion spring 48 has an end 48a which is fixed to the pawl 45a of the deceleration pulley 45 and another end 48b which is fixed to the engaging wall portion 50a of the acceleration pulley 50. As shown in FIG. 3, the torsion spring 48 urges the pawl 45a of the deceleration pulley 45 to be in contact with the engaging wall portion 50a of the acceleration pulley 50. Thus, when the driver treads on the acceleration pedal, the acceleration pulley 50 and the deceleration pulley 45 integrally rotate clockwisely in view of the motor 27. When the acceleration pedal is relieved, on the other hand, the acceleration pulley 50 and the deceleration pulley 45 integrally rotate counterclockwise by spring force of a return spring provided in the throttle.

The deceleration hook 44 has a decelerating pawl 44a which is bent toward the deceleration pulley 45. When the deceleration hook 44 rotates counterclockwise from the state shown in FIG. 3, the pawl 44a comes into contact with a wall surface 45b of the deceleration pulley 45, to push the same. When the deceleration hook 44 further rotates counterclockwise in this state, the deceleration pulley 45 is pushed by the deceleration hook 44 to also rotate in counterclockwise direction.

Referring to FIGS. 4 and 5, the acceleration hook 51 has an accelerating pawl 51a which is bent toward the acceleration pulley 50 and a switch pressing part 51b. The switch pressing part 51b can be brought into contact with an electrical switch 57, which is fixedly mounted on the acceleration pulley 50. The accelerating pawl 51a of the acceleration hook 51 can be brought into contact with the engaging wall portion 50a of the acceleration pulley 50 to press the same, when the acceleration hook 51 rotates clockwisely in view of the motor 27. In the state shown in FIGS. 3 and 4, the accelerating pawl 51a of the acceleration hook 51 is in contact with the engaging wall portion 50a of the acceleration pulley 50.

Referring to FIGS. 3 and 5, another electrical switch 56 is also fixedly mounted on the deceleration pulley 45. The electrical switch 56 comes into contact with the engaging wall portion 50a of the acceleration pulley 50 when the deceleration pulley 45 and the acceleration pulley 50 rotate oppositely to each other against force of the torsion spring 48.

Configurations, positional relations etc. of the respective elements forming the wire driving part 31 are so selected as to achieve the following operation.

The spring force of the torsion spring 48 is set to be larger than that of the return spring of the throttle. Therefore, when no driving force is supplied from the motor 27, the pawl 45a of the deceleration pulley 45 is in contact with the engaging wall portion 50a of the acceleration pulley 50, as shown in FIG. 3. In this state, the switch pressing part 51b of the acceleration hook 51 is in contact with the electrical switch 57 to bring the same into an ON state, as shown in FIG. 4. When the rotary shaft 29 is driven to rotate in a decelerating side, i.e., counterclockwise in view of the motor 27, the acceleration hook 51 and the deceleration hook 44 also rotate in the decelerating side, whereby the decelerating pawl 44a of the deceleration hook 44 comes into contact with the wall surface 45b of the deceleration pulley 45. In this state, the switch pressing part 51b of the acceleration hook 51 is separated from the electrical switch 57, which is in an OFF state.

The electromagnetic coil 42 of the stator 43 is not energized in normal operation of the acceleration pedal. Therefore, the output shaft 28 of the motor 27 has no relation with the rotary shaft 29. When the driver treads on the acceleration pedal in this state, the acceleration pulley 50 and the deceleration pulley 45 integrally rotate in an accelerating side while maintaining contact between the engaging wall portion 50a and the pawl 45a, thereby to increase the throttle opening.

In order to decrease the throttle opening for traction control etc. in this state, the electromagnetic coil 42 of the stator 43 is energized to bring a clutch into an ON state. Then, the clutch plate 41 is attracted by the stator 43, whereby the internal gear 40 is fixed to the body 35. In other words, rotation of the output shaft 28 of the motor 27 is transmitted to the rotary shaft 29. Thus, the motor 27 is driven to allow rotation of the rotary shaft 29 in the decelerating side. Then, the deceleration hook 44 also rotates in the decelerating side, so that the decelerating pawl 44a comes into contact with the wall surface 45b of the deceleration pulley 45. When the rotary shaft 29 further rotates in the decelerating side, the deceleration pulley 45 is pushed by the deceleration hook 44 to also rotate in the decelerating side, thereby to decrease the throttle opening.

In this case, the acceleration pulley 50 cannot rotate if the driver maintains acceleration through the acceleration pedal. Therefore, the pawl 45a of the deceleration pulley 45 is separated from the engaging wall portion 50a of the acceleration pulley 50. The acceleration hook 51 rotates in the decelerating side with the rotary shaft 29, whereby the switch pressing part 51b of the acceleration hook 51 is separated from the electrical switch 57, to bring the same into an OFF state. Thus recognized is that the throttle opening is being decreased against the operation of the acceleration pedal by the driver.

If the driver desires to decelerate the vehicle and gradually relieves the acceleration pedal, the acceleration pulley 50 rotates in the decelerating side by spring force of the torsion spring 48, so that the engaging wall portion 50a of the acceleration pulley 45 finally comes into contact with the pawl 45a of the deceleration pulley 45. At this time, the switch pressing part 51b of the acceleration hook 51 comes into contact with the electrical switch 57 which is fixed on the acceleration pulley 50, to bring the electrical switch 57 into an ON state. Thus, the electrical switch 57 detects the fact that the driver's control input to the acceleration pedal exceeds the controlled variable by the motor 27. On the basis of this information, energization to the electromagnetic coil 42 of the stator 43 is stopped. Consequently, the clutch plate 41 is separated from the stator 43, so that no rotation of the output shaft 28 is transmitted to the rotary shaft 29. Thus, the vehicle is decelerated along the driver's control input to the acceleration pedal.

In this case, the clutch may not be immediately turned off but the rotary shaft 29 can be driven in the decelerating side to a position for again bringing the electrical switch 57 into an OFF state.

In order to accelerate the vehicle to a set speed in automatic cruising or the like, the electromagnetic coil 42 of the stator 43 is energized to allow rotation of the rotary shaft 29 in an accelerating side. Then the accelerating pawl 51a of the acceleration hook 51 pushes the engaging wall portion 50a of the acceleration pulley 50, to drive the same in the accelerating side. In response to this, the deceleration pulley 45 also rotates in the accelerating side by urging force of the torsion spring 48, to increase the throttle opening. In this state, the pawl 45a of the deceleration pulley 45 is in contact with the engaging wall portion 50a of the acceleration pulley 50, while the switch pressing part 51b of the acceleration hook 51 is in contact with the electrical switch 57, which is in an ON state. Thus recognized is that the throttle opening is being increased over the driver's control input to the acceleration pedal.

When the driver desires to accelerate the vehicle in excess of the set speed and treads on the acceleration pedal in this state, the acceleration pulley 50 rotates in the accelerating side and the engaging wall portion 50a thereof is separated from the pawl 45a of the deceleration pulley 45. At the same time, the electrical switch 57 is separated from the switch pressing part 51b of the acceleration hook 51, to enter an OFF state. Thus, the electrical switch 57 detects that the driver's control input to the acceleration pedal exceeds the controlled variable by the motor 27. On the basis of this information, energization to the electromagnetic coil 42 of the stator 43 is stopped, so that the output shaft 28 of the motor 27 has no relation to the rotary shaft 29. Consequently, the vehicle can be accelerated along the driver's control input to the acceleration pedal.

The electrical switch 56 fixedly mounted on the deceleration pulley 45 is adapted to prevent overloading of the motor 27. The electrical switch 56 comes into contact with the engaging wall portion 50a of the acceleration pulley 50 when the controlled variable is at the maximum in either the accelerating or decelerating side. In the state of such contact, the electrical switch 56 enters an ON state to stop energization of the electromagnetic coil 42 of the electrical switch 56.

Although the present invention has been described and illustrated on the basis of two embodiments, it is clearly understood that the same is by way of illustration and example only and is not to be taken by way of limitation, the spirit and scope of the present invention being limited only by the terms of the appended claims.

What is claimed is:

1. A throttle opening control actuator provided between a throttle being regularly urged by a return spring in a direction for decreasing its opening in order to regulate engine output of a vehicle and an acceleration pedal coupled with said throttle by mechanical coupling means, said throttle opening control actuator comprising:
   a driving unit for supplying driving force;
   a movable element being displaceable in opposite directions by said driving force from said driving unit;
   an opening direction contact part provided in an intermediate position of said mechanical coupling means to be in contact with said movable element upon displacement of said movable element in one direction and forcibly pushed by said movable element in a direction for increasing throttle opening;
   a closing direction contact part provided in an intermediate position of said mechanical coupling means to be in contact with said movable element upon displacement of said movable element in the other direction and forcibly pushed by said movable element in a direction for decreasing throttle opening;
   opening direction detecting means for electrically detecting the state of contact between said movable element and said opening direction contact part; and
   closing direction detecting means for electrically detecting the state of contact between said movable element and said closing direction contact part.

2. A throttle opening control actuator in accordance with claim 1, wherein
   both of said opening and closing direction detecting means are electrical switches.

3. A throttle opening control actuator in accordance with claim 2, wherein
   said movable element positioned between said opening direction contact part and said closing direction contact part has a small distance of displacement required to be in contact with either said contact part, and
   said opening direction detecting means and said closing direction detecting means are implemented by the same electrical switch, which enters an ON state only when said movable element is brought into contact with either said contact part.

4. A throttle opening control actuator in accordance with claim 1, wherein
   said mechanical coupling means is divided into a first coupling part being close to said acceleration pedal and a second coupling part being close to said throttle,
   said first and second coupling parts are urged to approach each other by spring means having urging force larger than that of said return spring, and
   said opening direction contact part is provided in said first coupling part while said closing direction contact part is provided in said second coupling part.

5. A throttle opening control actuator in accordance with claim 1, wherein
   said movable element, said opening direction contact part and said closing direction contact part are displaced in directions of rotation respectively.

6. A throttle opening control actuator in accordance with claim 1, wherein
   said driving unit includes:
   a reservoir containing working fluid,
   a pump for sucking said working fluid from said reservoir and pressurizing the same,
   a cylinder having an inlet port for introducing said working fluid supplied from said pump and an outlet port for discharging working fluid contained in the interior toward said reservoir, and
   a piston slidable within said cylinder,
   said movable element being fixed to said piston.

7. A throttle opening control actuator in accordance with claim 6, wherein
   said driving unit further includes:
   a first directional control valve provided in a first fluid path connecting said pump with said inlet port,
   a second directional control valve provided in a second fluid path connecting said outlet port with said reservoir, and
   a third directional control valve provided in a third fluid path connecting said first fluid path with said second fluid path.

8. A throttle opening control actuator in accordance with claim 1, wherein
   said driving unit includes:
   a motor, and
   a rotary shaft driven to rotate by said motor,
   said movable element being fixed to said rotary shaft.

9. A throttle opening control actuator in accordance with claim 8, wherein
   said mechanical coupling means is divided into a first coupling part being close to said acceleration pedal and a second coupling part being close to said throttle,
   said first coupling part includes an acceleration pulley rotatably supported on said rotary shaft and an acceleration pedal side wire coupling said acceleration pulley with said acceleration pedal,
   said second coupling part includes a deceleration pulley rotatably supported on said rotary shaft and a throttle side wire coupling said deceleration pulley with said throttle,
   said mechanical coupling means further includes a spring member having urging force larger than that of said return spring and urging said acceleration pulley and said deceleration pulley to approach each other,
   said opening direction contact part is provided in said acceleration pulley, and
   said closing direction contact part is provided in said deceleration pulley.

* * * * *